(12) United States Patent
Buske

(10) Patent No.: US 11,731,216 B2
(45) Date of Patent: Aug. 22, 2023

(54) DEVICE FOR WORKING A SURFACE OF A WORKPIECE BY MEANS OF A LASER BEAM AND METHOD FOR OPERATING THE DEVICE

(71) Applicant: PlasmaTreat GmbH, Steinhagen (DE)

(72) Inventor: Christian Buske, Bielefeld (DE)

(73) Assignee: Plasmatreat GmbH, Steinhagen (DE)

( * ) Notice: Subject to any disclaimer, the term of this patent is extended or adjusted under 35 U.S.C. 154(b) by 992 days.

(21) Appl. No.: 16/093,259

(22) PCT Filed: Apr. 13, 2017

(86) PCT No.: PCT/EP2017/058908
§ 371 (c)(1),
(2) Date: Oct. 12, 2018

(87) PCT Pub. No.: WO2017/178580
PCT Pub. Date: Oct. 19, 2017

(65) Prior Publication Data
US 2019/0202008 A1    Jul. 4, 2019

(30) Foreign Application Priority Data
Apr. 14, 2016  (DE) .................... 10 2016 106 960.4
May 25, 2016  (DE) .................... 10 2016 109 662.8

(51) Int. Cl.
*B23K 28/02*   (2014.01)
*B23K 1/005*   (2006.01)
(Continued)

(52) U.S. Cl.
CPC ............ *B23K 28/02* (2013.01); *B23K 1/0056* (2013.01); *B23K 10/00* (2013.01); *B23K 26/062* (2015.10);
(Continued)

(58) Field of Classification Search
CPC .... B23K 10/00; B23K 1/0056; B23K 26/062; B23K 26/0643; B23K 26/0884;
(Continued)

(56) References Cited

U.S. PATENT DOCUMENTS 5,700,989 A    12/1997  Dykhno et al.
5,841,097 A *  11/1998  Esaka .................. B23K 26/067
                                                    219/121.63
(Continued)

FOREIGN PATENT DOCUMENTS

CN    102695577 A    9/2012
CN    103094837 A    5/2013
(Continued)

OTHER PUBLICATIONS

"Arc Welding, In: Jiangru Pan, ed., Fundamental Practice Tutorial on Engineering Training", UEST Publishing House (The University of Electronic Science and Technology), Jan. 2016, p. 145. (Relevant for reasons stated in the CN Office Action).
(Continued)

*Primary Examiner* — Chris Q Liu
(74) *Attorney, Agent, or Firm* — The Webb Law Firm

(57) ABSTRACT

The invention relates to a device (2) for working a surface (4) of a workpiece (6) by means of a laser beam (8), comprising a laser system (12) for providing the laser beam (8) and a plasma nozzle (14), which is designed to produce an atmospheric plasma jet (16), wherein the plasma nozzle (14) has a nozzle opening (24, 24'), from which a plasma jet (8) produced in the plasma nozzle (24, 24') exits during operation, wherein the laser system (12) and the plasma nozzle (14) are arranged in relation to each other and designed in such a way that, during operation, the laser beam (8) exits from the nozzle opening (24, 24') of the plasma nozzle (14) together with the plasma jet (16). The invention
(Continued)

further relates to an assembly (100) having such a device and to a method for operating said device (2).

10 Claims, 5 Drawing Sheets

(51) Int. Cl.
*B23K 10/00* (2006.01)
*B23K 26/14* (2014.01)
*B23K 26/08* (2014.01)
*B23K 26/06* (2014.01)
*B23K 26/21* (2014.01)
*B23K 26/361* (2014.01)
*B23K 26/062* (2014.01)
*B23K 26/362* (2014.01)

(52) U.S. Cl.
CPC ...... *B23K 26/0643* (2013.01); *B23K 26/0884* (2013.01); *B23K 26/1423* (2013.01); *B23K 26/1476* (2013.01); *B23K 26/21* (2015.10); *B23K 26/361* (2015.10); *B23K 26/362* (2013.01)

(58) Field of Classification Search
CPC ............ B23K 26/1423; B23K 26/1476; B23K 26/21; B23K 26/361; B23K 26/362; B23K 28/02
USPC ............ 219/121.61, 121.64, 121.39, 121.44, 219/121.46, 121.59, 121.6, 121.63, 219/121.69, 121.84, 121.85, 137 R, 219/121.45, 121.5, 121.51, 121.55, 219/121.68, 121.72, 121.74, 121.77, 219/121.78
See application file for complete search history.

(56) References Cited

U.S. PATENT DOCUMENTS

| | | | |
|---|---|---|---|
| 6,940,036 | B2 | 9/2005 | Bayer et al. |
| 2003/0102294 | A1* | 6/2003 | Kinbara .................... G01B 7/14 |
| | | | 219/121.84 |
| 2004/0262269 | A1 | 12/2004 | Matile |
| 2008/0257379 | A1 | 10/2008 | Buske et al. |
| 2012/0234802 | A1* | 9/2012 | Wahl ...................... B23K 26/38 |
| | | | 219/121.85 |
| 2012/0261391 | A1* | 10/2012 | Ihde ......................... H05H 1/42 |
| | | | 219/121.52 |
| 2013/0199540 | A1* | 8/2013 | Buske .................. A61B 18/042 |
| | | | 128/845 |
| 2014/0352835 | A1 | 12/2014 | Lin et al. |
| 2016/0311059 | A1* | 10/2016 | Obara .................. B23K 26/082 |

FOREIGN PATENT DOCUMENTS

| | | |
|---|---|---|
| CN | 103635624 A | 3/2014 |
| DE | 10136951 A1 | 2/2003 |
| DE | 102007011235 A1 | 9/2008 |
| JP | 2002113588 A | 4/2002 |
| JP | 2011152570 A | 8/2011 |
| JP | 5413218 B2 | 2/2014 |
| WO | 2011029462 A1 | 3/2011 |

OTHER PUBLICATIONS

"Plasma Arc Welding, In: Material Teaching and Experimenting Editing Group, ed., Material Mircrostructure, Properties and Processing Technology Independent Experiments", Xi'an Jiaotong University Press, Feb. 2015, pp. 415-419, vol. 2. (Relevant for reasons stated in the CN Office Action).

* cited by examiner

DEVICE FOR WORKING A SURFACE OF A WORKPIECE BY MEANS OF A LASER BEAM AND METHOD FOR OPERATING THE DEVICE

CROSS-REFERENCE TO RELATED APPLICATIONS

This application is the United States national phase of International Application No. PCT/EP2017/058908 filed Apr. 13, 2017, and claims priority to German Patent Application Nos. 10 2016 106 960.4 and 10 2016 109 662.8, filed Apr. 14, 2016, and May 25, 2016, respectively, the disclosures of which are hereby incorporated in their entirety by reference.

The invention relates to a device for working a surface of a workpiece by means of a laser beam, having a laser system for providing the laser beam and having a plasma nozzle which is configured for generating an atmospheric plasma beam, wherein the plasma nozzle has a nozzle opening, out of which a plasma beam generated in the plasma nozzle emerges in operation. The invention also relates to a method for operating the device.

BACKGROUND OF THE INVENTION

It is known from the prior art to work surfaces of a workpiece by means of a laser beam, for example in order to clean the workpiece by removing contaminants from the workpiece surface or in order to shape the workpiece by removing workpiece material itself.

When a workpiece surface is being cleaned by means of a laser beam it often occurs that a part of the contaminants removed by the laser beam precipitate on the workpiece surface again and thus re-contaminate it. When removing workpiece material during the shaping process by means of a laser beam, removed workpiece material can also partly precipitate on the workpiece surface again and can thus result in an irregular surface around the worked area.

In order to overcome this problem, it was proposed that in addition to the laser beam a plasma beam should also be directed onto the area to be worked on the workpiece surface. The material removed by the laser beam can be disintegrated or transformed by the plasma beam, so that it no longer precipitates on the workpiece surface. However, up to now, attempts to transfer this method on an industrial scale in a way which is reliable in terms of the process have been unsuccessful. In particular, the alignment of the plasma beam onto the area worked by the laser beam on the workpiece surface has proved difficult.

Against this background, the present invention is based on the object of providing a device for working a surface of a workpiece by means of a laser beam and a method for operating it, by means of which surfaces can be worked in a way which is reliable in terms of the process and is dependable.

With a device for working a surface of a workpiece by means of a laser beam, having a laser system for providing the laser beam and having a plasma nozzle which is configured for generating an atmospheric plasma beam, wherein the plasma nozzle has a nozzle opening, out of which a plasma beam generated in the plasma nozzle emerges in operation, this object is at least partly achieved according to the invention in that the laser system and the plasma nozzle are arranged relative to one another and configured such that in operation the laser beam emerges out of the nozzle opening of the plasma nozzle together with the plasma beam.

It has been found that a workpiece surface can be worked with a laser beam and, at the same time, impinged with a plasma beam in a way which is reliable in terms of the process by using a combined device, from which nozzle opening the laser beam and the plasma beam emerge together, instead of using two separate devices for the laser beam and for the plasma beam. In this way, the laser beam and the plasma beam are also always directed onto the same area on the workpiece surface to be worked.

The device serves to work a surface of a workpiece by means of a laser beam. The work of a surface of a workpiece can in particular be the cleaning of the surface to remove organic contaminants, for example. Such contaminants can be removed well by means of a laser beam, but easily get back to the surface again. The organic contaminants removed by the laser beam can be disintegrated or oxidised by means of the plasma beam, so that re-contamination of the surface is prevented.

SUMMARY OF THE INVENTION

The device comprises a laser system for providing the laser beam. Thus, by means of the laser system, the laser beam can be provided, by means of which the surface of a workpiece can be worked. The laser system can comprise a laser source, in particular a solid-state laser, such as a fibre laser. The laser system can also have an optical fiber, by means of which a laser beam can be guided from an external laser source into the laser system.

Preferably, a pulsed laser beam or a laser source for generating a pulsed laser beam is used. In addition, the laser system preferably has optics, in order to direct the laser beam onto the surface to be worked. The optics can, in particular, be mirror optics, in order to align the beam direction of the laser beam.

In addition, the device comprises a plasma nozzle which is configured for generating an atmospheric plasma beam. A plasma beam is presently understood to mean a directed gas beam which is at least partly ionised. An atmospheric plasma beam is understood to mean a plasma beam which is operated under atmospheric pressure, i.e. in which the plasma beam is directed into an environment which essentially has atmospheric pressure.

The plasma nozzle has a nozzle opening, out of which a plasma beam generated in the plasma nozzle emerges in operation. The beam direction of the plasma beam is predetermined by the position of the nozzle opening. By aligning the nozzle opening, the plasma beam can be directed onto a certain area on the surface of a workpiece.

The laser system and the plasma nozzle are arranged relative to one another and configured such that in operation the laser beam emerges out of the nozzle opening of the plasma nozzle together with the plasma beam. For this purpose, the plasma nozzle is in particular designed in such a way that a laser beam provided by the laser system can be guided through the plasma nozzle and out of the nozzle opening of the plasma nozzle. In addition, the laser system is in particular arranged and configured in such a way that the laser beam provided by the laser system in operation runs through the plasma nozzle and out of the nozzle opening of the plasma nozzle.

The above mentioned object is furthermore at least partly achieved according to the invention by a method for operating the previously described device or an embodiment thereof, in which an atmospheric plasma beam is generated by means of the plasma nozzle, so that this plasma beam emerges out of the nozzle opening of the plasma nozzle, and in which a laser beam is provided by means of the laser system, so that the laser beam emerges out of the nozzle opening of the plasma nozzle at the same time as the plasma beam.

By the laser beam and the plasma beam both emerging out of the nozzle opening at the same time, an area on the surface of the workpiece to be worked can be impinged simultaneously with the laser beam and the plasma beam, so that material removed from the workpiece surface by the plasma beam, in particular a contamination, can be disintegrated or transformed, in particular oxidised, by the plasma beam.

The previously described device and the previously described method preferably serve to clean a surface of a workpiece.

Various embodiments of the device and of the method are described below, in which the individual embodiments can each be applied both for the device and for the method and also can be combined with one another.

In a first embodiment of the method, the plasma beam emerging out of the nozzle opening and the laser beam emerging out of the nozzle opening are directed onto a surface of a workpiece to be worked. In this way, the surface of the workpiece can be worked by means of the laser beam and the plasma beam can disintegrate or transform the material removed by the laser beam.

In a further embodiment, the plasma nozzle has a tubular housing and in operation the laser beam runs through the tubular housing of the plasma nozzle. For this purpose, in particular the laser system and the plasma nozzle are arranged relative to one another and configured such that the laser beam in operation runs through the tubular housing of the plasma nozzle. Preferably, the laser system is arranged on the side of the plasma nozzle opposite the nozzle opening of the plasma nozzle. The laser beam running through the housing is in this way shielded from the environment on its way to the nozzle opening, so that operational safety is increased.

In a further embodiment, the plasma nozzle is configured to generate an atmospheric plasma beam by means of an arc-like discharge in a working gas, wherein the arc-like discharge can be generated by applying a high-frequency high voltage between electrodes. In a corresponding embodiment of the method, the atmospheric plasma beam is generated by means of an arc-like discharge in a working gas, wherein the arc-like discharge is generated by applying a high-frequency high voltage between electrodes.

Nitrogen ($N_2$), a nitrogen-hydrogen mixture ($N_2/H_2$; forming gas), argon (Ar), an argon-nitrogen mixture ($Ar/N_2$) or oxygen ($O_2$) can be used as the working gas, for example. If oxidation of the surface to be worked is to be avoided, then preferably reducing forming gas which actively works against oxidation is used. Forming gas is intrinsically a slightly reducing gas. This reducing effect is, however, considerably increased in the plasma beam. Alternatively, Ar or $Ar/N_2$ can also be used, whereby oxygen can be kept away from the worked area. If oxidation of the surface to be worked can be tolerated, $O_2$ is preferably used as the working gas, since the material removed from the surface by the laser beam can be disintegrated or transformed (oxidised) well in this way.

A high-frequency high voltage is typically understood to mean a voltage of 1-100 kV, in particular 1-50 kV, preferably 10-50 kV, at a frequency of 1-300 kHz, in particular 1-100 kHz, preferably 10-100 kHz, more preferably 10-50 kHz. In this way, a reactive plasma beam can be generated which can be focused well and hence is well suited for disintegrating or transforming material removed from a workpiece surface by the laser beam. In addition, a plasma beam generated in such a way has a relatively low temperature, so that damage to the workpiece can be prevented.

In a further embodiment, the plasma nozzle has an inner electrode arranged inside the housing. In particular, a high-frequency high voltage can be applied between the inner electrode and the housing, in order to generate an arc-like discharge in a working gas flowing through the plasma nozzle, so that a plasma beam forms. Plasma nozzles having such an inner electrode enable a stable discharge and hence a stable plasma beam to be generated.

In a further embodiment, the plasma nozzle has an inner electrode with an inner channel, which inner electrode is arranged inside the housing, and in operation the laser beam runs through the inner channel to the nozzle opening. For this purpose, in particular the laser system and the plasma nozzle are arranged to one another and configured such that in operation the laser beam runs through the inner channel and though the nozzle opening.

It has been found that a laser beam can be guided through a plasma nozzle having an inner electrode in an advantageous way by providing the inner electrode with an inner channel, so that the laser beam can be directed straight though the inner electrode. The inner channel of the inner electrode is in particular aligned with the nozzle opening of the plasma nozzle. The laser system is preferably arranged on the side of the plasma nozzle opposite the nozzle opening of the plasma nozzle.

In a further embodiment, the laser system is configured to continuously vary the beam direction of the laser beam such that the position of the laser beam in the cross-section of the nozzle opening changes continuously. In a corresponding embodiment of the method, the direction of the laser beam is continuously varied such that the position of the laser beam in the cross-section of the nozzle opening changes continuously. In this way, the area worked by the laser beam on the surface of the workpiece can be increased.

The position of the laser beam in the cross-section of the nozzle opening is understood to mean the position in the plane of the nozzle opening at which the laser beam passes through the nozzle opening and hence through this plane. A continuous variation is understood to mean that the beam direction of the laser beam is continuously changed. The laser system can, for example, have mirror optics with a moveable mirror, through which the beam direction of the laser beam can be varied.

The laser system preferably varies the beam direction of the laser beam cyclically, for example in such a way that the position of the laser beam in the cross-section of the nozzle opening moves forwards and backwards on a line or moves on a circle.

The variation of the beam direction of the laser beam by the laser system has the advantage that the area on the surface of the workpiece worked by the laser beam can be increased and, in fact, even without having to change the alignment of the plasma nozzle with the workpiece.

The variation of the beam direction is preferably adapted to the size of the nozzle opening. In this way, the entire width of the nozzle opening can be utilised and as large an area as possible on the workpiece surface can be worked with the laser beam.

The nozzle opening can be circular in shape, oval in shape or slit-shaped. In the case of a slit-shaped nozzle opening, the beam direction of the laser beam can in particular be varied such that the position of the laser beam in the cross-section of the nozzle opening moves forwards and backwards over the length of the slit. A slit-shaped nozzle opening also has the advantage that higher plasma temperatures can be obtained than with round nozzle openings. In this way, the plasma results in a better and in particular more rapid disintegration or transformation of the material removed from the surface to be worked by the laser beam.

In a further embodiment, the device is configured such that it can be attached to a robot arm, in particular to a multi-axis robot arm. In this way, a surface of a workpiece can be worked by the device in an automated manner. Integrating the plasma nozzle and the laser system into one device and simultaneously impinging an area on the workpiece surface with the laser beam and the plasma beam in a way which is reliable in terms of the process makes robust operation possible and hence also integration on a robot arm without needing to laboriously regulate the alignment of the plasma nozzle and the laser beam in relation to one another.

Correspondingly, the above mentioned object is furthermore achieved according to the invention by an arrangement for working a surface of a workpiece having a robot arm and having the previously described device or an embodiment thereof, wherein the device can be mounted, preferably is mounted, on the robot arm.

In a further embodiment, the device or the arrangement comprises a controller for controlling the device or the arrangement, respectively, which controller is configured to control the device corresponding to the previously described method or one of the described embodiments thereof.

In one embodiment of the method, the device is guided relatively over the surface of a workpiece to be worked in such a way that the laser beam and the plasma beam describe a specified path on the workpiece surface. If the beam direction of the laser beam is varied by the laser system, then the greatest variation of the radiation direction preferably occurs transverse to the direction of the path. In this way, along the path a strip as wide as possible on the workpiece surface can be worked. In a corresponding embodiment of the arrangement, the robot arm is configured to guide the device relatively over the surface of a workpiece to be worked in such a way that the laser beam and the plasma beam describe a specified path on the workpiece surface. For instance, a control device can be provided which correspondingly controls the robot arm and possibly also the device which can be mounted or is mounted on the robot arm.

The previously described device, the previously described arrangement or the previously described method, as well as the respectively described embodiments thereof, can be advantageously used for laser welding or for laser soldering. Correspondingly, the object mentioned at the beginning is also at least partly achieved by the use of the previously described device, by the use of the previously described arrangement or by the use of the previously described method for laser welding or for laser soldering.

During laser soldering or laser welding, contaminants on the surface of the workpieces to be joined (in particular organic contamination) can hinder the soldering or welding process and impair the soldering or welding outcome. For example, contaminants on the workpieces can result in the formation of cavities in the welded joint which weaken it.

Due to the fact that when the previously described device is operated a laser beam and a plasma beam strike the workpiece to be worked (in this case, the workpiece to be joined) together in a way which is reliable in terms of the process, contaminants, in particular organic contaminants, which have been removed from the workpiece surface can be disintegrated by the plasma beam in the gas phase, so that they can no longer precipitate on the workpiece or in the solder pool or weld pool. In this way, the environment around the solder pool or weld pool generated by the laser beam is cleaned by the plasma beam, so that soldered or welded seams can be produced which are as free from defects as possible. Hence, the device and the method are particularly suitable for laser soldering or laser welding.

In one embodiment of the method, a soldering or welding filler, particularly in powder form, can be at least partly conducted through the plasma nozzle, so that it emerges out of the nozzle opening of the plasma nozzle together with the plasma beam and the laser beam. For example, a solder, e.g. tin-solder, can be introduced as powder into the head of the plasma nozzle. The plasma nozzle can in particular be configured for this purpose.

By the interaction of the soldering or welding filler with the plasma beam, the soldering or the welding filler will be brought into the area of the joint or joining seam in a targeted manner. In particular, the soldering or the welding filler can already be fused by the plasma beam, whereby the soldering or the welding filler can be better introduced into the solder pool or weld pool.

The previously described device, the previously described arrangement or the previously described method, as well as the respectively described embodiments thereof, can additionally be advantageously used for the removal of corrosion. Correspondingly, the object mentioned at the beginning is also at least partly achieved by the use of the previously described device, by the use of the previously described arrangement or by the use of the previously described method for corrosion removal.

Corroded material can be removed from a workpiece surface by the laser beam, such as rust from the surface of an iron or steel workpiece. The removed material can be comminuted or chemically transformed by the plasma beam, which emerges out of the nozzle opening with the laser beam, so that this removed material does not precipitate on the workpiece surface again.

Preferably, the corrosion removal takes place under a reducing atmosphere, in order to prevent reoxidation of the workpiece, in particular as a result of the high temperatures due to the laser beam. This can in particular be achieved in a way which is reliable in terms of the process by using a working gas for generating the plasma beam which has a reducing effect or which as a plasma beam has a reducing effect. In particular, a mixture of consisting of hydrogen and nitrogen ($H_2/N_2$ mixture) can be used as the working gas. Such a mixture has a slightly reducing effect under normal conditions. However, due to the excitation in the plasma beam, a strongly reducing effect is obtained, so that reoxidation of a workpiece worked by the laser can be prevented.

BRIEF DESCRIPTION OF THE DRAWINGS

Further features and advantages of the present invention emerge from the following description of exemplary embodiments, in which reference is made to the attached figures.

DESCRIPTION OF THE INVENTION

Figure 1:
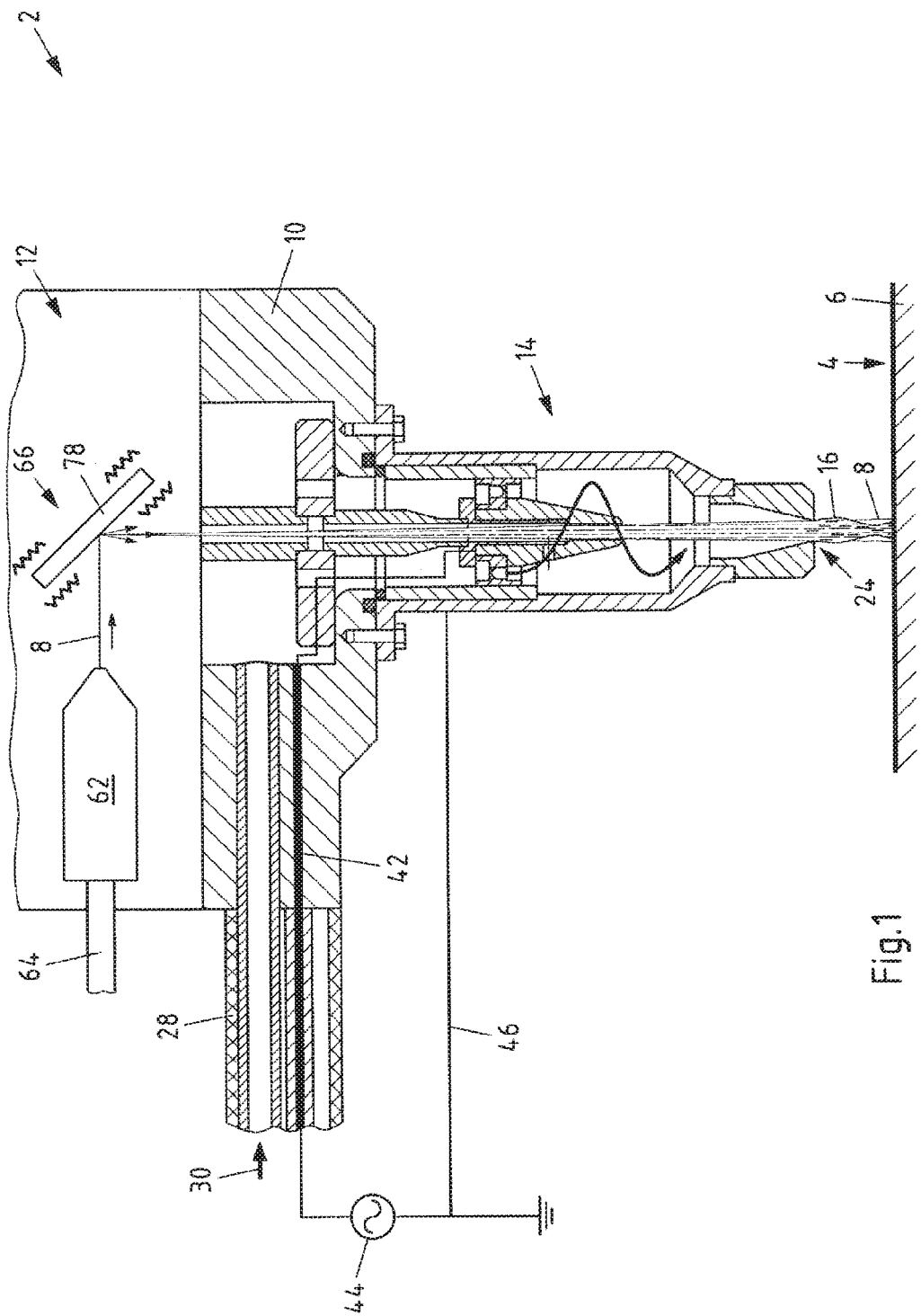
FIG. 1 shows an exemplary embodiment of the device according to the invention and of the method according to the invention in a schematic illustration.

The device 2 for working a surface 4 of a workpiece 6 by means of a laser beam 8 has a housing 10, in which a laser system 12 is integrated for providing the laser beam 8, and to which a plasma nozzle 14 is attached for generating an atmospheric plasma beam 16.

Figure 2:
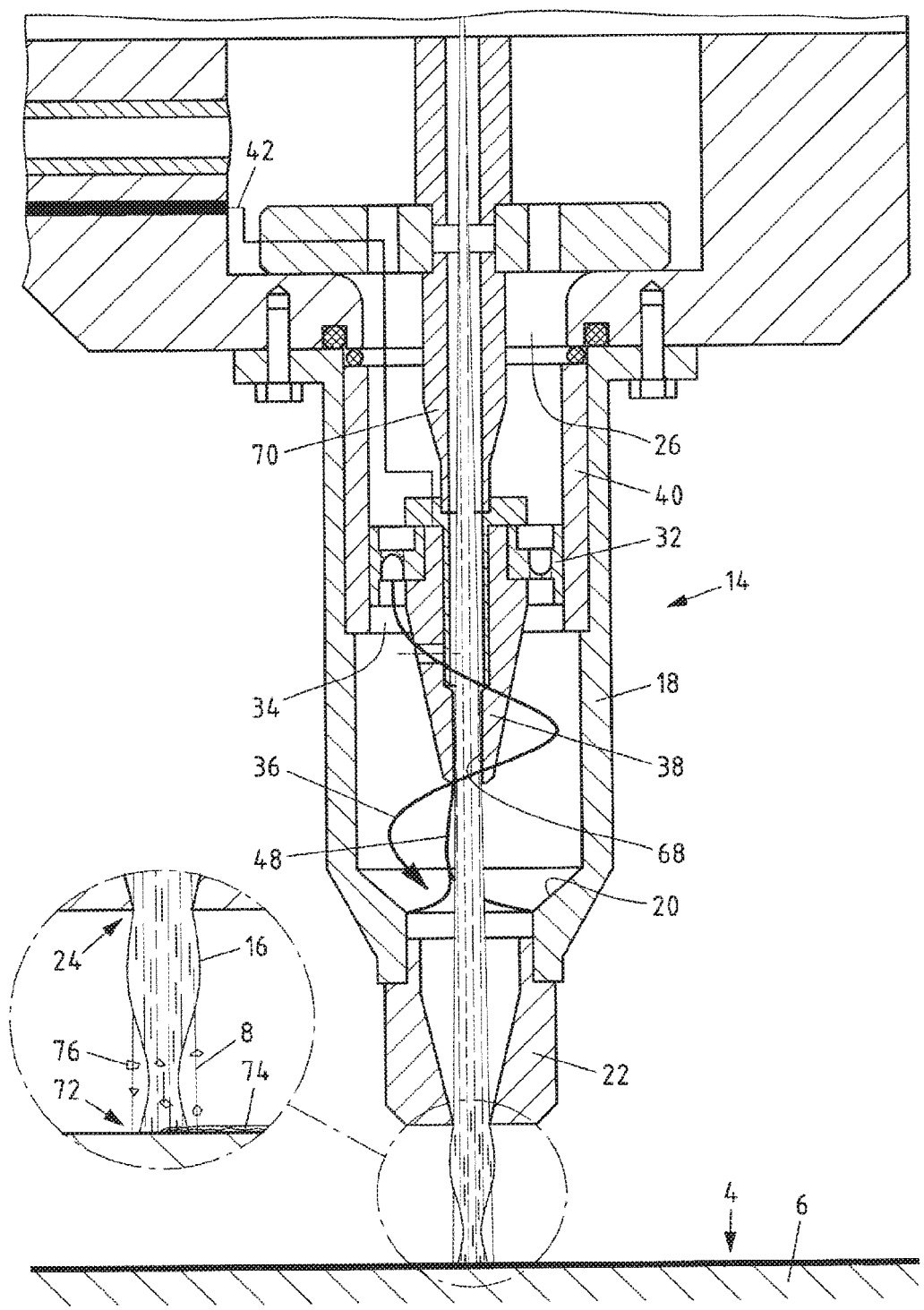
FIG. 2 shows a section of the device from FIG. 1 in an enlarged illustration.

Firstly, the structure and the method of operation of the plasma nozzle 14 are described below with the aid of FIG. 2 which shows the area of the plasma nozzle 14 of the device 2 from FIG. 1 in an enlarged illustration.

The plasma nozzle 14 has a tubular housing 18 in the form of a nozzle tube consisting of metal which is screwed to the housing 10 of the device 2. The nozzle tube 18 has a conical tapering 20 on its one end, on which a replaceable nozzle head 22 is mounted, the outlet of which forms a nozzle opening 24, out of which the plasma beam 16 emerges in operation.

On the end opposite to the nozzle opening 24, the nozzle tube 18 is attached to a working gas feed pipe 26 of the housing 10. The working gas feed pipe 26 is in turn connected via a hose package 28, which is attached to the housing 10, to a working gas source (not shown) which is under pressure with a variable throughput. In operation, a working gas 30 is fed from the working gas source through the hose package 28 and the working gas feed pipe 26 into the nozzle tube 18.

In addition, a swirl device 32 having a ring of holes 34 positioned obliquely in the circumferential direction is provided in the nozzle tube 18, through which holes 34 the working gas 30 fed into the nozzle tube 18 is swirled in operation.

Thus, the downstream part of the nozzle tube 18 is flowed through by the working gas 30 in the form of a vortex 36, the core of which runs on the longitudinal axis of the nozzle tube 18.

In addition, an inner electrode 38 is arranged centrally in the nozzle tube 18 and extends coaxially in the nozzle tube 18 in the direction of the nozzle opening 24. The inner electrode 38 is electrically connected to the swirl device 32. The swirl device 32 is electrically insulated against the nozzle tube 18 by a ceramic tube 40. A high-frequency high voltage, which is generated by a transformer 44, is applied to the inner electrode 38 via a high-frequency conductor 42 led through the hose package 28. The nozzle tube 18 is earthed by means of an earth conductor 46 which can also be led through the hose package 28. A high-frequency discharge in the form of an electric arc 48 is generated between the inner electrode 38 and the nozzle tube 18 by means of the applied voltage.

The terms "electric arc", "arc discharge" or "arc-like discharge" are in this case used as phenomenological descriptions of the discharge, since the discharge occurs in the form of an electric arc. The term "electric arc" is otherwise also used as a discharge form in direct voltage discharges with essentially constant voltage values. In this case, however, it is a high-voltage discharge in the form of an electric arc, i.e. a high-frequency arc-like discharge.

Due to the swirling flow of the working gas, this electric arc 48 is channeled in the vortex core in the area of the axis of the nozzle tube 18, so that it only branches out in the area of the tapering 20 to the wall of the nozzle tube 18.

The working gas 30, which rotates at a high flow velocity in the area of the vortex core and hence in close proximity to the electric arc 48, comes into intimate contact with the electric arc 48 and is as a result partly converted into the plasma state, so that an atmospheric plasma beam 16 emerges out of the plasma nozzle 14 through the nozzle opening 24.

The laser system 12 integrated in the housing 10 of the device 2 has a laser source 62, for example a fibre laser, which in operation generates the laser beam 8. The laser source 62 is supplied with electrical energy via a supply line 64. As an alternative to the laser source 62, the device 2 can, for example, also have an optical fiber which is attached to an external laser source. The laser system 12 additionally has mirror optics 66, by means of which the laser beam 8 generated by the laser source 62 can be deflected.

The laser system 12 and the plasma nozzle 14 are arranged relative to one another and configured such that in operation the laser beam 8 emerges out of the nozzle opening 24 of the plasma nozzle 14 together with the plasma beam 16. The inner electrode 38 of the plasma nozzle 14 has an inner channel 68 for this purpose, the longitudinal axis of which is aligned with the nozzle opening 24. A coupling tube 70 is attached to the inner electrode 38 and extends the inner channel 68 into the housing 10 all the way to the laser system 12. The mirror optics 66 of the laser system 12 are arranged in such a way that the laser beam 8 generated by the laser source 62 is directed into the coupling tube 70, runs through the inner channel 68 of the inner electrode 38 and the nozzle tube 18 all the way to the nozzle opening 24 and thus emerges out of the nozzle opening 24 together with the plasma beam 16.

In this way, the laser beam 8 and the plasma beam 16 in operation reach the surface 4 of the workpiece 6 together and on the same area 72. The workpiece surface 4 is worked by the incident laser beam 8 on the area 72, in which material, such as a contaminant 74, on the surface 4 is vaporised by the laser beam 8. The material 76 vaporised by the laser beam 8 is disintegrated or transformed by the plasma beam 16, so that it cannot precipitate on the surface 4 again. In this way, in particular organic contamination can be removed from a surface, since the organic material removed by the laser beam is disintegrated and oxidised by the plasma beam.

In addition, the device 2 can also be used for removing corrosion, in which corroded material, such as rust, is removed from a workpiece surface 4 by the laser beam 8. The corroded material is disintegrated or transformed by the means of the plasma beam 16, so that it does not precipitate on the surface 4 again. In order to prevent oxidation of the surface with the high temperatures due to the laser beam 8, forming gas is preferably used as the working gas 30, which as a plasma beam 16 has a strongly reducing effect.

While the plasma beam has a diameter of typically several millimetres, the laser beam 8 typically has a diameter of less than 1 mm, in particular less than 200 μm, and therefore has a correspondingly small spot size on the surface 4 to be worked. For this reason, the laser beam 8 is preferably continuously swiveled, so that a larger area of the surface 4 can be worked independently of a relative movement between the plasma nozzle 14 and the surface 4.

For this purpose, the laser system 12 is configured to continuously vary the beam direction of the laser beam 8 such that the position of the laser beam 8 in the cross-section of the nozzle opening 24 varies continuously. To that end, the laser system 12 has a mirror 78 which can be swiveled by means of a corresponding control (not illustrated). The beam direction of the laser beam 8 can be varied by swiveling the mirror 78, so that the laser beam 8 can be directed into the coupling tube 70 at different angles. The coupling tube 70, the inner channel 68 and the nozzle opening 24 are dimensioned in such a way that the laser beam 8 can also reach the nozzle opening 24 at the different angles and can exit through it and out of the plasma nozzle 14. Preferably, the plasma nozzle has a diameter of at least 3 mm, at least in one direction. In the case of a round nozzle opening, the diameter is preferably in the range from 3 mm to 6 mm. In the case of a slit-shaped nozzle opening, the slit length, i.e. the nozzle diameter in the slit direction, is preferably up to 30 mm.

Figure 3C:
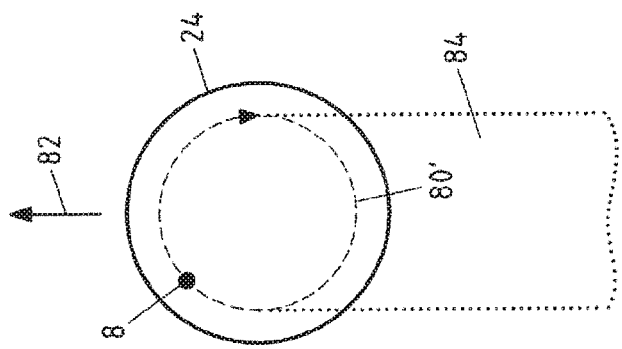
FIGS. 3a-c show three examples of nozzle openings and trajectories of the position of the laser beam in the cross-section of the nozzle openings.
Figure 3B:
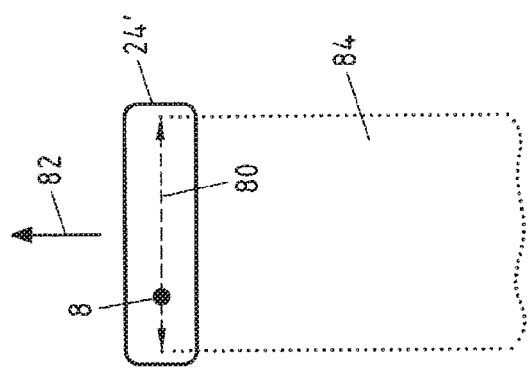
Figure 3A:
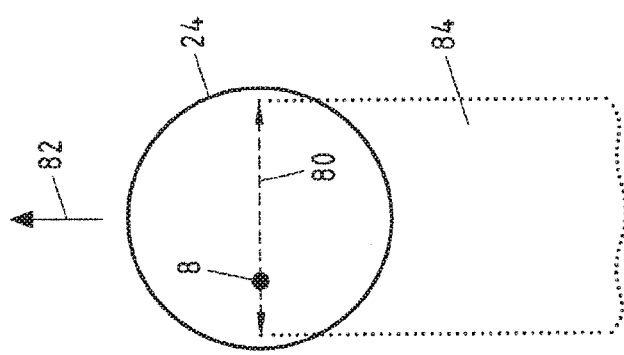

Three examples of nozzle openings 24, 24' and trajectories 80, 80' of the position of the laser beam 8 in the cross-section of the nozzle openings 24, 24' are illustrated in FIGS. 3a-c. The figures each show the cross-section of the nozzle openings, the position of the laser beam in the nozzle opening cross-section (black dot) and the trajectory of the laser beam position in the nozzle opening cross-section by movement of the mirror 78 (dashed arrows).

FIG. 3a firstly shows a round nozzle opening 24 which, for example, can have a diameter of 5 mm. The mirror 78 is controlled such that it continuously moves forwards and backwards in one direction, so that correspondingly the position of the laser beam 8 in the nozzle opening cross-section moves forwards and backwards on a straight trajectory 80. The surface 4 can thereby be worked on a linear area without movement of the plasma nozzle 14.

The device 2 or the plasma nozzle 14, on the one hand, and the surface 4, on the other hand, can be moved relative to one another in order to work a larger surface area on the surface 4. The plasma nozzle 14 is preferably moved transverse to the greatest extension of the trajectory 80 (indicated by the arrow 82). In this way, when the plasma nozzle 14 is moved a strip as wide as possible on the surface 4 of the workpiece 6 is worked.

FIG. 3b shows an alternative slit-shaped nozzle opening 24' with a slit which is approximately 5 mm long. The trajectory 80 of the position of the laser beam 8 is, as in FIG. 3a, linear and aligned corresponding to the slit direction.

FIG. 3c again shows the round nozzle opening 24 with a diameter of 5 mm. In this exemplary embodiment, the mirror 78 is swiveled in two directions in such a way that the position of the laser beam 8 moves on a circle, i.e. a circular trajectory 80' results.

A circular trajectory, as in FIG. 3c, has the advantage that the same strip width results independently of the movement direction of the plasma nozzle 14. On the other hand, a linear trajectory, as in FIGS. 3a and 3b, has the advantage that the control of the mirror 78 is simplified and the strip width can be varied continuously by setting the angle between the axis of the trajectory 80 and the movement direction 82.

The previously described device 2 allows workpiece surfaces to be worked in a way which is reliable in terms of the process. It is ensured that the laser beam 8 and the plasma beam 16 strike the same area on the surface to be worked by the fact that the laser beam 8 and the plasma beam 16 emerge out of the nozzle opening 24 together. An elaborate and continuous control for aligning the laser beam 8 and the plasma beam 16 in relation to one another can therefore be dispensed with.

This enables the device to be used for working surfaces which are formed in a complicated way or for working different surface positions which make a swiveling of the device 2 necessary. Such a surface work can be advantageously carried out using a multi-axis robot arm.

Figure 4:
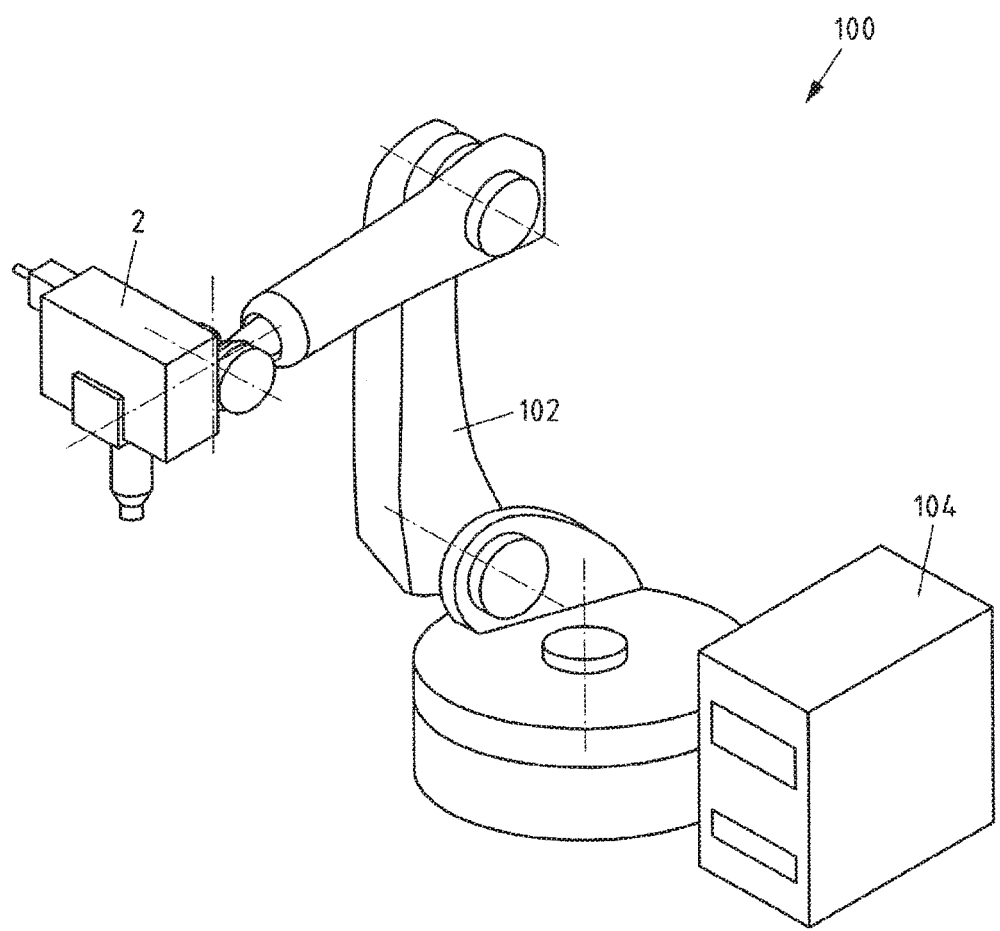
FIG. 4 shows an exemplary embodiment of the arrangement according to the invention and FIG. 5 shows an exemplary embodiment of the use according to the invention of the device or of the method.

FIG. 4 shows an arrangement 100 having such a robot arm 102, in this case a 6-axis robot arm, and the device 2 which is mounted onto the robot arm 102. For this purpose, the device 2 can have mounting means, such as threaded holes, for mounting it on the robot arm 102.

The device 2 can now be moved in any position and aligned arbitrarily using the robot arm 102, in order, for example, to move over a surface of a workpiece which is complicated to work. For this purpose, the arrangement 100 comprises another control device 104 in the form of a computer, by means of which the movements of the robot arm 102 and preferably also the operation of the device 2 can be controlled.

Figure 5:
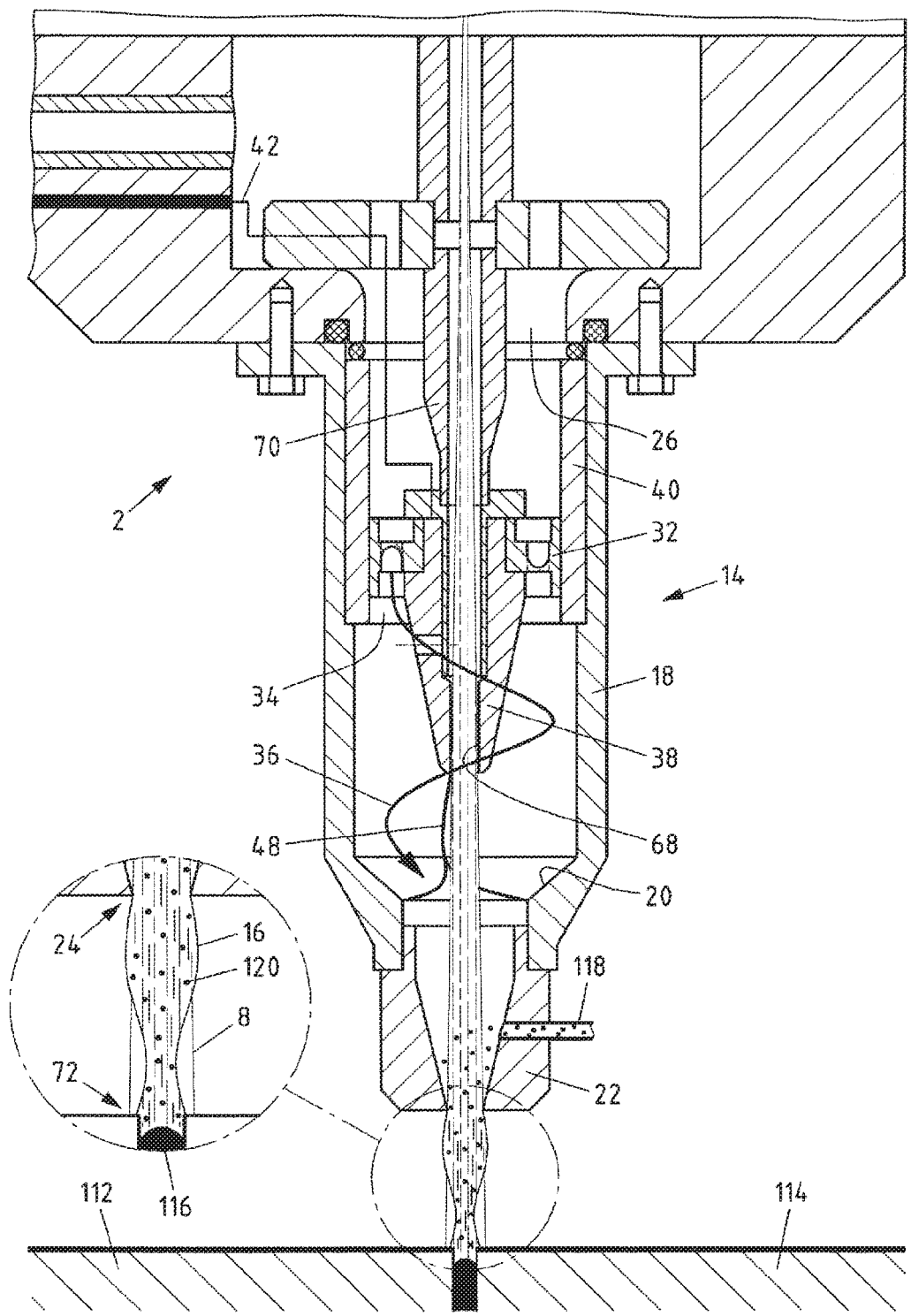

FIG. 5 shows an exemplary embodiment of the use of the device or of the method. The device 2 from FIG. 1 can in particular be used for laser soldering or laser welding. In the case of laser soldering, the laser beam 8 fuses a solder, by means of which two workpieces 112, 114 to be joined are wetted and after the solder has solidified are joined by the soldered seam 116 produced in this way. Here, the surfaces of the workpieces 112, 114 are worked to the extent that they are joined together by the soldered seam 116. The solder is preferably at least partly guided through the plasma nozzle 14. In particular, tin-solder 120 in powder form, for example, can be introduced by a feed 118 provided in the nozzle head 22 into the plasma nozzle 14 and as a consequence into the plasma beam 16. The tin-solder is then fused by the plasma beam 16 and reaches the joint at the soldered seam 116 through the flow of the plasma beam 16 in a targeted manner.

Correspondingly, the device 2 can also be used for laser welding, wherein in this case a welding filler can be introduced through the feed 118 into the plasma nozzle 14.

The arrangement 100 can in particular also be used for laser soldering or laser welding. In this way, soldered or welded joints can be produced controlled by computer at various places on a workpiece.

The invention claimed is:

1. A device for cleaning a surface of a workpiece by means of a laser beam, comprising:
    a laser system comprising a laser source and optics, capable of producing a laser beam, and
    a plasma nozzle, configured for generating an atmospheric plasma beam, the plasma nozzle comprising a nozzle opening, out of which the plasma beam, generated in the plasma nozzle, emerges in operation,
    wherein the laser system and the plasma nozzle are arranged relative to one another and configured such that, in operation, the laser beam emerges out of the nozzle opening of the plasma nozzle together with the plasma beam,
    the plasma nozzle further comprising a tubular housing and, in operation, the laser beam runs through the tubular housing of the plasma nozzle,
    wherein the plasma nozzle further comprises an inner electrode and an inner channel, the inner electrode arranged inside the tubular housing, and in operation the laser beam runs through the inner channel to the nozzle opening, and
    wherein the laser system is configured to clean the surface and to continuously vary a beam direction of the laser beam such that the position of the laser beam in a cross-section of the nozzle opening changes continuously.

2. The device according to claim 1, wherein the plasma nozzle is configured to generate an atmospheric plasma beam by means of an arc-like discharge in a working gas, wherein the arc-like discharge can be generated by applying a high-frequency high voltage between the inner electrode and the inner channel.

3. The device according to claim 1, wherein the device is configured such that it can be attached to a robotic arm.

4. The device according to claim 1, further comprising a controller configured to operate the device by controlling the generation of the atmospheric plasma beam such that the plasma beam and the laser beam emerge out of the nozzle opening at the same time, and controlling the variation of the laser beam's direction, such that the position of the laser beam in the cross-section of the nozzle opening changes continuously.

5. A method for operating a device according to claim 1, comprising:
- generating an atmospheric plasma beam in the plasma nozzle, such that the plasma beam emerges out of the nozzle opening of the plasma nozzle,
- providing a laser beam with the laser system, such that the laser beam emerges out of the nozzle opening of the plasma nozzle at the same time as the plasma beam, and
- continuously varying the direction of the laser beam such that the position of the laser beam in the cross-section of the nozzle opening changes continuously.

6. The method according to claim 5, further comprising directing the plasma beam emerging out of the nozzle opening and the laser beam emerging out of the nozzle opening onto a surface of a workpiece to be worked.

7. The method according to claim 5, further comprising at least one of the steps of welding, laser soldering, or removing corrosion.

8. A system for working a surface of a workpiece by means of a laser beam, comprising:
- a robot arm; and
- a device according to claim 1, wherein the device can be mounted on the robot arm.

9. A device for working a surface of a workpiece by means of a laser beam, comprising:
- a laser system comprising a laser source and optics, capable of producing a laser beam, and
- a plasma nozzle, configured for generating an atmospheric plasma beam, the plasma nozzle comprising a nozzle opening, out of which the plasma beam, generated in the plasma nozzle, emerges in operation,
- wherein the laser system and the plasma nozzle are arranged relative to one another and configured such that, in operation, the laser beam emerges out of the nozzle opening of the plasma nozzle together and at the same time with the plasma beam,
- the plasma nozzle further comprising a tubular housing and, in operation, the laser beam runs through the tubular housing of the plasma nozzle,
- wherein the plasma nozzle further comprises an inner electrode and an inner channel, the inner electrode arranged inside the tubular housing, and in operation the laser beam runs through the inner channel to the nozzle opening, and
- wherein the laser system is configured to continuously vary a beam direction of the laser beam such that the position of the laser beam in a cross-section of the nozzle opening changes continuously.

10. The device according to claim 9, further comprising a controller configured to operate the device by controlling the generation of the atmospheric plasma beam and controlling the variation of the laser beam's direction, such that the position of the laser beam in the cross-section of the nozzle opening changes continuously.

* * * * *